United States Patent
Holt et al.

(10) Patent No.: US 7,122,115 B2
(45) Date of Patent: *Oct. 17, 2006

(54) METHOD AND SYSTEM FOR CONTROLLING WATER SYSTEM FOULING

(75) Inventors: William Holt, Seabrook, TX (US); John V Kraft, Lipan, TX (US)

(73) Assignee: John V. Kraft, Lipan, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/078,273

(22) Filed: Mar. 12, 2005

(65) Prior Publication Data

US 2006/0201890 A1    Sep. 14, 2006

(51) Int. Cl.
*C02F 1/32* (2006.01)
*C02F 1/467* (2006.01)

(52) U.S. Cl. .................... 210/97; 210/134; 210/192; 210/205

(58) Field of Classification Search ............... 210/748, 210/764, 143, 198.1, 205, 97, 134, 192, 243, 210/739; 422/24, 29, 186.3; 204/278.5, 204/228.3; 205/701, 760
See application file for complete search history.

(56) References Cited

U.S. PATENT DOCUMENTS

| | | | |
|---|---|---|---|
| 4,451,341 A * | 5/1984 | Miller | 205/743 |
| 5,230,792 A * | 7/1993 | Sauska et al. | 210/97 |
| 5,364,512 A * | 11/1994 | Earl | 210/138 |
| 6,350,385 B1 | 2/2002 | Holt et al. | |
| 6,495,052 B1 * | 12/2002 | Miyamoto et al. | 210/764 |
| 6,800,207 B1 | 10/2004 | Holt et al. | |
| 6,852,236 B1 | 2/2005 | Holt et al. | |
| 6,972,415 B1 * | 12/2005 | Schaible et al. | 250/436 |
| 2002/0070107 A1 * | 6/2002 | Usinowicz et al. | 204/228.3 |
| 2003/0201234 A1 * | 10/2003 | Holt et al. | 210/748 |

FOREIGN PATENT DOCUMENTS

JP        09187773 A   *   7/1997

OTHER PUBLICATIONS

English Language translation of Japanese Patent Document No. H09-187773.*

* cited by examiner

*Primary Examiner*—Matthew O. Savage
(74) *Attorney, Agent, or Firm*—Joseph S. Heino; Patrick M. Bergin

(57) ABSTRACT

A method and system flows water through a water system in proximity to an ion generation device and to a source of ultraviolet (UV) radiation that combines photochemistry principles, heavy metal toxicity, and UV light radiation to form a highly effective combined water disinfection process. Using ion generation and UV irradiation, the method and system synergistically improves the disinfection and bactericidal effects of ion generation or UV radiation working individually by making ion-exposed microorganisms more susceptible and less resistant to the bactericidal effects of UV radiation. The combined method and system of the present invention may include control means such that the method and system can be configured for single pass through, dual pass through or for recirculation such that the order of exposure to the ion generation and UV radiation aspects can be varied or altered. The method and system of the present invention may also be provided with means for controlling the system flow rate, ion generation and UV radiation levels to maximize performance, to minimize energy consumption, and, in some situations, to selectively target certain microorganisms for inactivation.

4 Claims, 3 Drawing Sheets

METHOD AND SYSTEM FOR CONTROLLING WATER SYSTEM FOULING

FIELD OF THE INVENTION

This invention relates generally to methods and devices used with water systems. More particularly, it relates to a method and system for exposing water, flowing through the water system, to the synergistic combination of an ion generator and a source of ultraviolet radiation whereby the exposed water and its contents are irradiated by the ultraviolet light and metallic ions are fed into the water flow to prevent fouling of the water system by algae, nuisance invertebrates, microorganisms, and inorganic salts. This invention also specifically relates to an enhanced method and system that utilizes the ion generating devices of the inventors' prior inventions, as disclosed and claimed in U.S. Pat. Nos. 6,350,385; 6,800,207; and 6,852,236.

BACKGROUND OF THE INVENTION

Ultraviolet light (UV) radiation has long been considered a viable method for drinking water disinfection due to its ability to inactivate protozoa and other microbial species. UV of a given wavelength is absorbed by the cellular nucleotides of bacteria, viruses and other microorganisms and causes cross-linking, or demerization, of their RNA and DNA, thereby destroying their ability to multiply and thereby effectively disinfecting the water. Further, UV light radiation does not create significant disinfection by-products. However, due to the cost that is directly proportional to power requirements, UV disinfection can be very expensive to implement. Power requirements for UV disinfection depend primarily on the required fluence, or the product of irradiance and exposure time.

Ion generators have also been employed in previous attempts to control algae, nuisance invertebrates, and microorganisms. Such ion generators are based on well-known principles of electrochemical reactions, one of which is referred to as electrolysis. Electrolysis is an electrochemical process by which electrical energy is used to promote chemical reactions that occur on the surface of functionally cooperating electrodes. One electrode, called the anode, involves the oxidation process where chemical species lose electrons. A second electrode, called the cathode, involves the reduction process where electrons are gained. In water, for example, oxygen is generated at the anode and hydrogen is generated at the cathode. The generation of hydrogen and oxygen in fresh water by the process of electrolysis will be weak due to the low electrical conductivity of the water. The oxygen generated aids in the prevention of the deposit of inorganic salts on the electrodes. The function of an ion generator is also to produce metal ions, typically copper ions or silver ions. Metal ion production is accomplished by use of an electrically charged metal anode that comprises atoms of the metal ions that are to be generated. It is the purpose of the ion generator to feed the metal ions out of the generator before they can be deposited on a cathode. The metal ions and oxygen, both of which are produced by the ion generator, are feed into the water stream of the water system to prevent fouling of the system by algae, nuisance invertebrates, microorganisms, and inorganic salts. As previously mentioned, these inventors have devised ion generators utilizing these principles and which are the subject of U.S. Pat. Nos. 6,350,385; 6,800,207; and 6,852,236 issued to Holt, et al.

The toxicity of copper and silver to aquatic organisms is well established although the exact mechanism is not well defined. The bactericidal effects of silver, for example, have been known for centuries. Silver has been shown to be effective as a disinfectant against coliforms and viruses, including human adenoviruses, as well as other microbial species. In general, these heavy metals must be in an ionic form in order for them to be toxic to invertebrates, microorganisms and algae. The eradication of microorganisms is attributed to positively charged ions that are both surface active and microbiocidal. These ions attach themselves to the negatively charged bacterial cell wall of the microorganism and destroy cell wall permeability. This action, coupled with protein de-naturation, induces cell lysis and eventual death. One advantage to the use of metal ionization, for example, is that eradication efficacy is wholly unaffected by water temperature. Chlorine, a commonly used antifouling chemical, is somewhat temperature dependent. Furthermore, the metal ions actually kill the microorganisms, and other microorganism-promoting bacteria and protozoa, rather than merely suppress them, as in the case of chlorine. This minimizes the possibility of later re-colonization. Other advantages of metal ionization compared to other eradication techniques include relatively low cost, straightforward installation, easy maintenance, and the presence of residual disinfectant throughout the system. In water, and at concentrations sufficient for bactericidal activity, silver does not impart taste, color or odor and has no apparent detrimental effects on mammalian cells. Accordingly, the United States Environmental Protection Agency (USEPA) does not set a primary drinking water standard for silver.

The photochemistry of silver salts, or silver compounds, is also well known. When silver salts are exposed to light, silver ions and free electrons are generated which, in turn, combine to form silver atoms. The silver atoms produce the "latent image" which is enhanced through the development process.

In the view of these inventors, what is needed is an ion generating and UV generating disinfection system that uniquely combines silver photochemistry principles, heavy metal toxicity, and UV light radiation to form a highly effective combined water disinfection method and system. Such a combination would be highly lethal to a broad range of microbial organisms, including viruses, because it would synergistically improve the disinfection or bactericidal effects of ion generation or UV radiation working individually. This synergism occurs because, for example, silver ions complex with the DNA of microorganisms, making them even more susceptible is and less resistant to the bactericidal effects of UV radiation. Such a combined method and system would, in effect, work to immediately kill most of the microorganisms and then cause a residual killing mechanism to greatly enhance the water disinfection process. In the view of these inventors, what is needed is such a method and system whereby the system can be configured for single pass through, dual pass through or for recirculation such that the order of exposure to the ion generation and UV radiation aspects can be varied, altered, or combined as desired or required by any particular application. What is also needed is such a method and system that includes means for controlling ion concentration and UV fluence levels to maximize performance, to minimize energy consumption, and, in some situations, to selectively target certain microorganisms for inactivation.

SUMMARY OF THE INVENTION

It is, therefore, a principal object of this invention to provide a new and useful method and system for exposing the water flow within a water system to an ion generation device and to a source of UV radiation that combines silver photochemistry principles, heavy metal toxicity, and UV light radiation to form a highly effective combined water disinfection process. It is another object of this invention to provide such a method and system whereby the combination is highly lethal to a broad range of microbial organisms, including viruses. It is still another object of the present invention to provide such a method and system that synergistically improves the disinfection or bactericidal effects of ion generation or UV radiation working individually by making ion-exposed microorganisms more susceptible and less resistant to the bactericidal effects of UV radiation. It is yet another object of the present invention to provide such a combined method and system whereby immediate killing of most of the microorganisms occurs and then residual killing follows as to other microorganisms to greatly enhance the water disinfection process. It is still another object of the present invention to provide such a method and system whereby the system can be configured for single pass through or for recirculation such that the order of exposure to the ion generation and UV radiation aspects can be varied or altered as desired or required by any particular application. It is yet another object of the present invention to provide such a method and system whereby means are provided for controlling ion concentration and UV fluence levels to maximize performance, to minimize energy consumption, and, in some situations, to selectively target certain microorganisms for inactivation.

The present invention has obtained these objects. It provides a method and system in which water flowing through a water system flows in proximity to an ion generation device and to a source of UV radiation that combines silver photochemistry principles, heavy metal toxicity, and UV light radiation to form a highly effective combined water disinfection process. Using ion generation and UV irradiation, the method and system synergistically improves the disinfection and bactericidal effects of ion generation or UV radiation working individually by making ion-exposed microorganisms more susceptible and less resistant to the bactericidal effects of UV radiation. The combined method and system of the present invention may include control means such that the method and system can be configured for single pass through, multiple pass through, or for recirculation such that the order of exposure to the ion generation and UV radiation aspects can be varied or altered. The method and system of the present invention may also be provided with means for controlling ion generation and UV fluence levels to maximize performance, to minimize energy consumption, and, in some situations, to selectively target certain microorganisms for inactivation.

The foregoing and other features of the method and system of the present invention will be apparent from the detailed description that follows.

DETAILED DESCRIPTION

Figure 1:
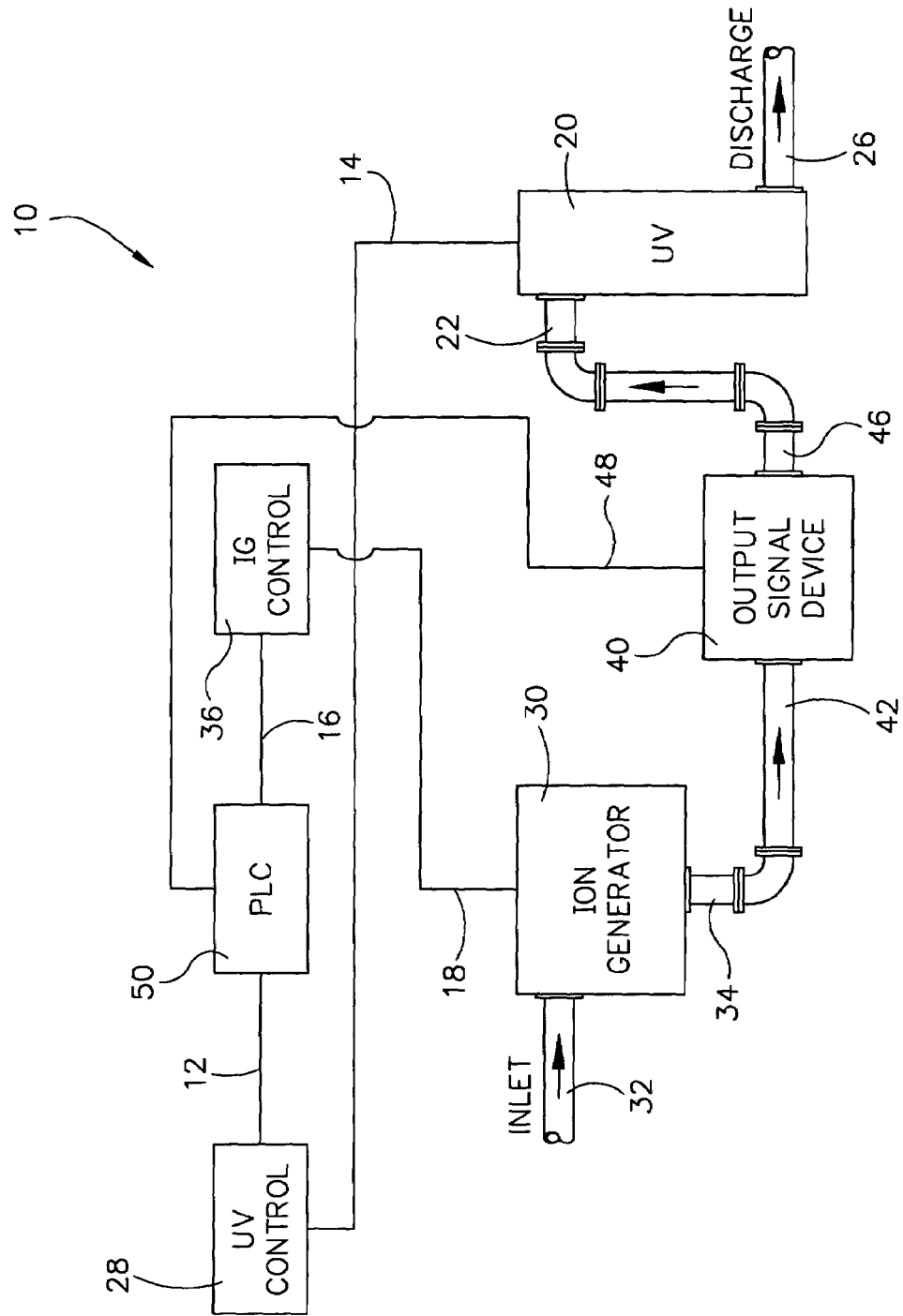
FIG. 1 is a schematic diagram illustrating a combined ion generating and UV generating disinfection system configured in a one pass system in accordance with the present invention.

Referring now to the drawing in detail, FIG. 1 illustrates a schematic diagram of a first preferred embodiment of a system, generally identified 10, that utilizes the method of the present invention. As shown, the system 10 includes the essential components of a UV disinfection unit 20 and a silver ion generator 30, the components being configured in a one pass system 10. That is, water flowing through the system 10 passes through the system 10 and each of its essential components 20, 30 only once. The UV disinfection unit 20 and the silver ion generator 30 form part of a water flow continuum. More specifically, the UV disinfection unit 20 is configured for attachment to a water input line 22 and to an output line 26, which is also the system discharge line. The ion generator 30 is similarly configured for attachment to a water input line 32 and to an output line 34, the input line 32 also being the system inlet line. The output line 34 of the ion generator 30 is functionally attached to the input line 22 of the UV disinfection unit 20. As shown, the UV disinfection unit 20 is downstream from the ion generator 30. However, such is not a limitation of the present invention. The system 10 could be alternatively configured to place the ion generator 30 downstream from the UV disinfection unit 20 without deviating from the scope of the present invention. Interposed between the ion generator 30 and the UV disinfection unit 20 is an output signal device 40, the significance of which will be apparent later in this detailed description.

The UV disinfection unit 20 of the present invention is of a type that uses a special low-pressure mercury vapor lamp. Preferably, the lamp is mounted out of the water or is housed in a UV-transparent sleeve that is located inside a water flow chamber, the lamp not being in direct contact with the water. One or more lamp and sleeve arrays may be used. Water passing through the unit 20 is directly exposed to the UV radiation that is emitted by the lamp. The water flow chamber can be a cylindrical or other shaped aluminum or stainless steel shell having a highly polished inner surface such that UV light is reflected off the inner surface and back into the water flow in a mirror-like fashion. In this way, the UV radiation is dissipated almost entirely within the water because all reflections are near loss-less of the total internal reflectivity of the shell. In order to "kill" microorganisms, the UV radiation must actually strike the cell. Accordingly, certain water contaminants can somewhat reduce the transmissivity of UV radiation within the shell and, ultimately, the amount of UV radiation that reaches the bacteria or virus sought to be irradiated. Additionally, suspended particles may result in partially "shielding" certain microorganisms that are buried within the particles, thus passing those microorganisms through the shell unaffected by the UV radiation. It is generally recognized that the germicidal wavelength of UV radiation is between 100 and 300 nanometers, which lies between visible light and x-rays on the electromagnetic wavelength spectrum. The optimal UV wavelength for disinfection is 254 nanometers which is the mercury resonance line of most commercially-available short wave low pressure mercury vapor tubes. It is to be understood, however, that the precise configuration of the shell, and of the UV light tube or tubes within the shell, is not a limitation of the present invention. Various configurations could be used without deviating from the scope of the claims that follow.

The ion generator 30 of the present invention is of the type more specifically described in U.S. Pat. Nos. 6,350,385; 6,800,207; and 6,852,236, each of which is incorporated herein by reference, and generally includes a containment tank that is cylindrical in physical configuration. Attachable to the tank is a tank cover or lid preferably constructed of a special polymer plastic material that provides strength, durability and electrical non-conductivity. Attached to the underside of the lid are a number of functionally cooperating electrodes, including at least one anode and at least one cathode. It is to be understood that the number of such electrodes is not a functional limitation of the present invention. Other combinations could be provided, such as two anodes and two cathodes, and so on, without deviating from the scope of the present invention. The anode and the cathode are each fabricated in the shape of a rectangular prism. In the preferred embodiment of the system 10 of the present invention, the anode is made of silver as is the cathode. Again, the material from which each of the electrodes is made is not a limitation of the present invention, other than that the material used must enable the process of electrolysis. An electrical potential is applied across at least one anode and at least one cathode and providing electronic circuitry for providing periodic polarity reversal between said at least one anode and said at least one cathode. In the preferred embodiment, a power supply on the order of several hundred watts may be applied to achieve the electrochemical process of electrolysis across the electrodes.

The anode and the cathode are placed in parallel planar relation to one another. In this parallel planar relation, the plane defined by each electrode is substantially parallel to the axis of the input line 32. The input line 32 is generally perpendicular to the axis of the tank of the ion generator 30. The tank and the input line 32 are functionally cooperative to allow water to flow into the tank interior in a whirlpool-like or double vortex flow. In this fashion, water enters the tank and is directed to forcibly flow between the electrodes. Upon exiting the area between the electrodes, the water follows an annular wall surface in a whirlpool-like or turbulent double vortex-type fashion. That is, the water flow is effectively "split" at that portion of the wall surface immediately opposite the input and continues in two opposite directions back around the electrodes and along the wall surface. This double vortex turbulence facilitates the electrolysis process and the migration of silver ions away from the anode and away from the cathode before the ions have a chance to attach themselves to the cathode thus defeating the purpose of ionic water treatment. The water ionization serves to control algae, nuisance invertebrates, microorganisms and inorganic salts lurking in other parts of the water system 10 within which the ion generator 30 is incorporated. As the eletrolysis process continues, an electronic polarity reverser cycles at reversing rates deemed appropriate for a specific site operation. Gradually, the anode effectively becomes used up as ions are given up to the water flow. The containment tank also includes a sight glass defined within the wall of the tank, the purpose of which is to provide visual access to the tank interior. The sight glass allows the user to view the containment tank interior to determine if anode wastage has occurred to the point that the anode must be replaced.

In the first preferred embodiment shown in FIG. 1, the UV disinfection unit 20 is electronically coupled 14 to, and its operation is controlled by, a UV controller 28. Similarly, the ion generator 30 is electronically coupled 18 to, and its operation is controlled by, an ion generator (IG) controller 36. The UV controller 28 and the IG controller 36 are each electronically coupled 12, 16, respectively, to a programmable logic controller (PLC) 50. Alternatively, the PLC 50 may include the controllers 28, 36 as part of its integrated circuitry. The system 10 also includes an output signal device 40, as previously mentioned, the output signal device 40 being electronically coupled 48 to the PLC 50. The output device 40 provides a signal to the PLC 50 based on flow rate. The PLC 50 is electronically coupled 12, 16 to controllers 28, 36. Controllers 28, 36 are electronically coupled 14, 18 to UV disinfection unit 20 and ion generator 30, respectively. Controllers 28, 36 adjust UV fluence 20 and ion concentration generation 30 based on flow demand. The output device 40 further includes an input line 42, the input line 42 being coupled to the output line 34 of the ion generator 30, and an output line 46, the output line 46 being coupled to the input line 22 of the UV disinfection unit 20.

In application, water flows into the system 10 by means of the first input line 32 to the ion generator 30. The water is treated by ionic discharge as it passes through the unit 30. The treated water is discharged at the output line 34 of the ion generator 30 and flows through the input line 22 of UV disinfection unit 20. The water is then treated by UV radiation as it passes through this UV disinfection unit 20. The output signal device 40 may be used to control ion generation and UV fluence levels to maximize performance, to minimize energy consumption, and, in some situations, to selectively target certain microorganisms for inactivation. In short, any number of system parameters may be monitored and controlled by use of the output signal device 40 in combination with the PLC 50. During this process, it is also to be understood that a pre-programmed scheme exists within the PLC 50 for operating the controllers 28, 36 and the UV disinfection unit 20 and the ion generator 30, respectively, as is desired or required. It is also to be understood that the configuration of the preferred embodiment of the system 10 could be altered to place the UV disinfection unit 20 upstream from the ion generator 30 without deviating from the scope of this invention.

Figure 2:
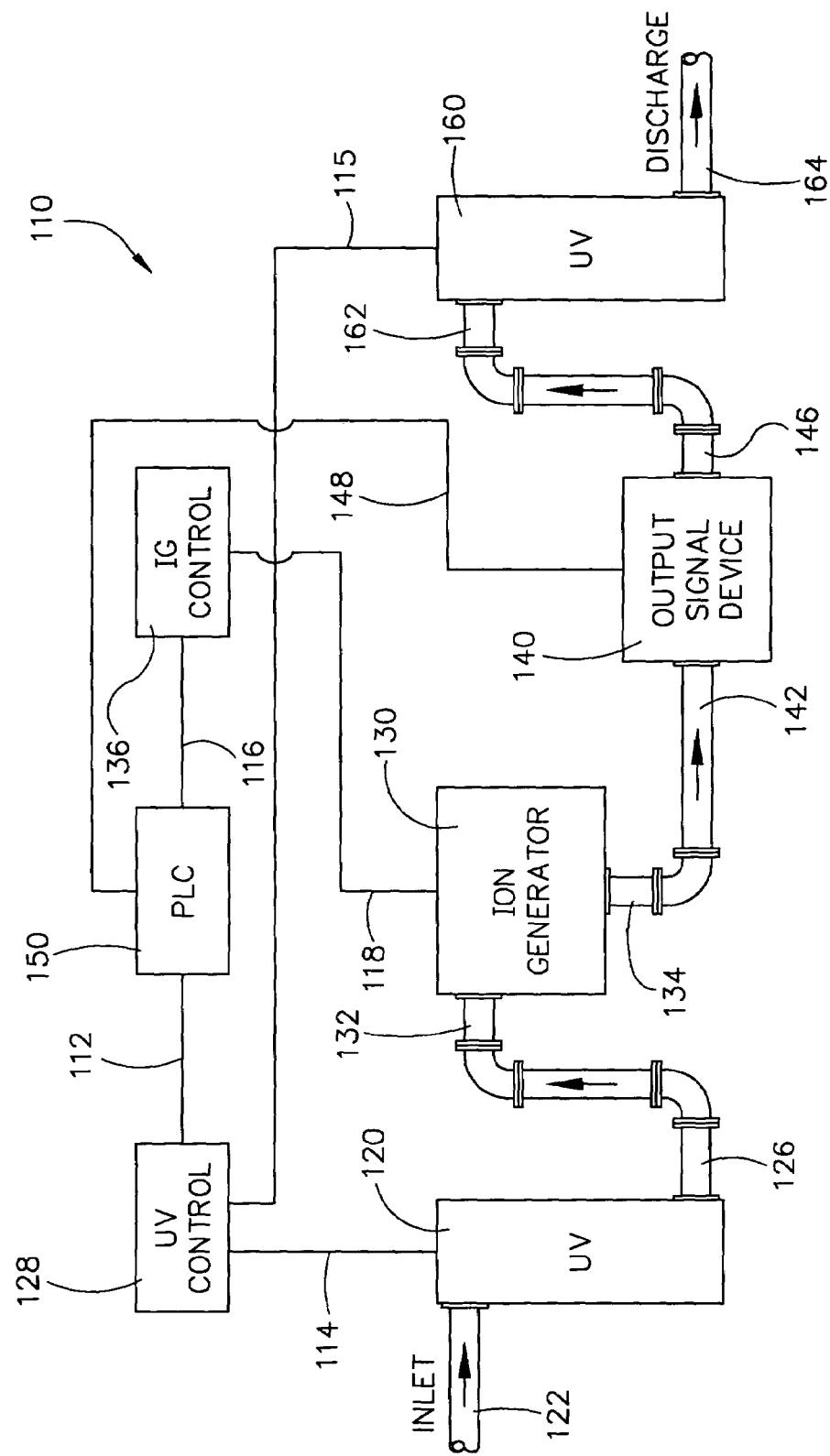
FIG. 2 is a schematic diagram illustrating a combined ion generating and UV generating disinfection system configured in a dual one pass system in accordance with the present invention.

Referring now to FIG. 2, it illustrates a schematic diagram of a second preferred embodiment of a system, generally identified 110, that also utilizes the method of the present invention. As shown, the system 110 includes the essential components of a first UV disinfection unit 120, a second UV disinfection unit 160 and a silver ion generator 130, the components being configured in a dual one pass system 110. That is, water flowing through the system 110 passes through the system 110 and the one ion generator 130, but through two UV disinfection units 120, 160. The UV disinfection units 120, 160 and the silver ion generator 130 form part of the water flow continuum. As shown, the first UV disinfection unit 120 is configured for attachment to a water input line 122, or water inlet, and to an output line 126. The second UV disinfection unit 160 is attached to a water input line 162 and a water output line 164, which is also the system discharge line. The ion generator 130 is similarly configured for attachment to a water input line 132 and to an output line 134, the input line 132 being attachable to the output line 126 of the first UV disinfection unit 120 and the output line 134 being attachable to the inlet line 162 of the second UV disinfection unit 160. As shown, the first UV disinfection unit 120 is upstream from the ion generator 130 and the second UV disinfection unit 160 is downstream from it. Interposed between the ion generator 130 and the second UV disinfection unit 160 is an output signal device 140 having a water inlet line 142 and an outlet line 146. In application, the operation of this alternative embodiment system 110 is essentially the same at that described above for the first system 10 with the exception that the UV controller 128 is coupled 114, 115 to each of the UV disinfection units 120, 160, respectively. The ion generator 130 is coupled 118 to the IG controller 136 and the PLC 150 is coupled 112, 116 to each of the controllers 128, 136, respectively. Any number of system parameters may be monitored and controlled by use of the output signal device 140 in combination with the PLC 150. During this process, it is also to be understood that a pre-programmed scheme exists within the PLC 150 for operating the controllers 128, 136 and the UV disinfection units 120, 160 and the ion generator 130, respectively, as is desired or required.

Figure 3:
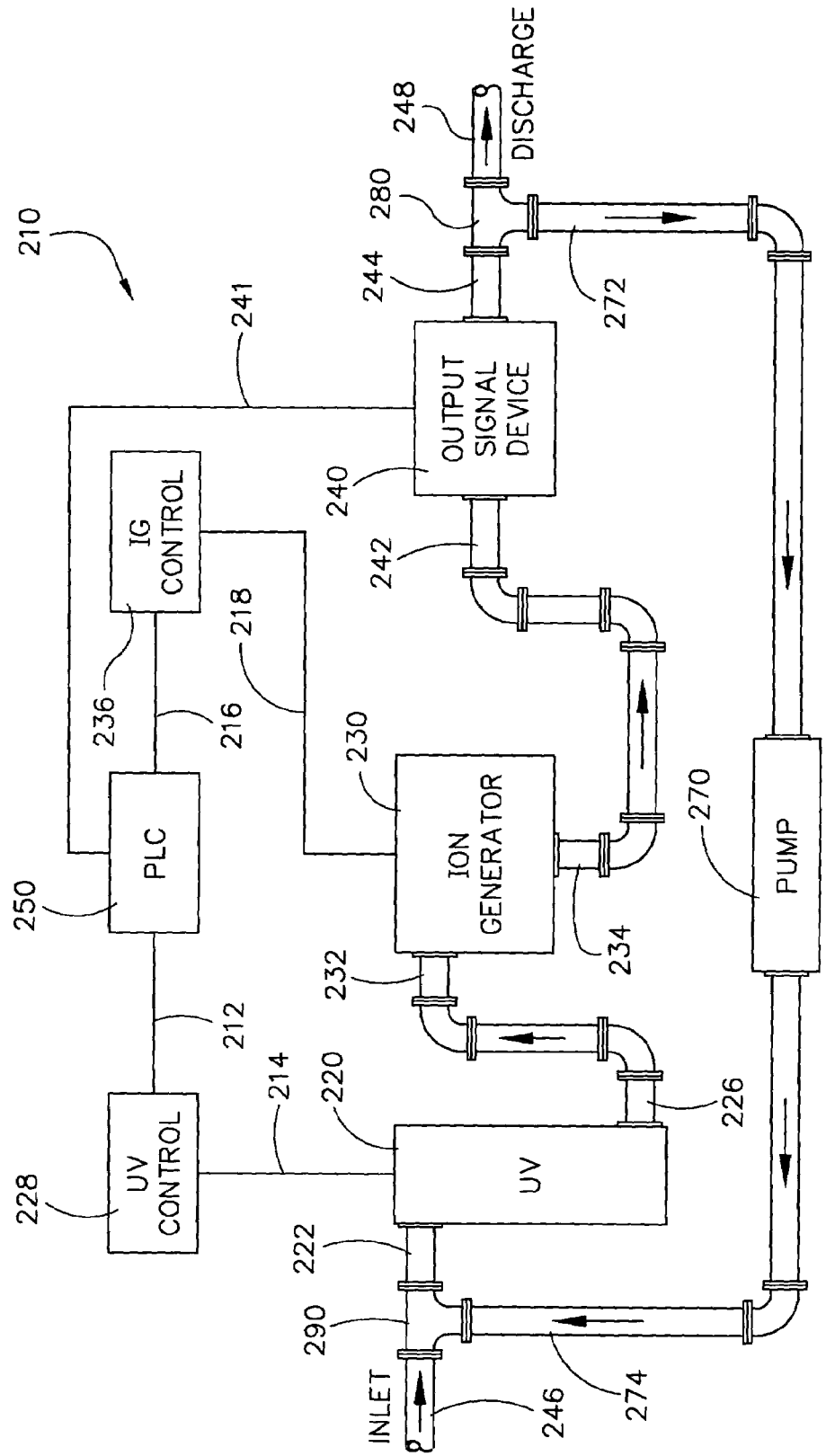
FIG. 3 is a schematic diagram illustrating a combined ion generating and UV generating disinfection system configured in a recirculating system in accordance with the present invention.

FIG. 3 illustrates yet another schematic diagram of a third preferred embodiment of a system, generally identified 210, that similarly utilizes the method of the present invention. As shown, the system 210 includes the essential components of a UV disinfection unit 220 and a silver ion generator 230, the components being configured in a re-circulating system 210. That is, water flowing through the system 210 passes through the system 210 and the essential components 220, 230, but may also be re-circulated from the system discharge and back to the system inlet 222 by means of a re-circulation pump 270. In this system 210, the UV disinfection unit 220, the silver ion generator 230, and the pump 270, each form part of the water flow continuum. As shown, the UV disinfection unit 220 is configured for attachment to a water input line 222 and to an output line 226. The UV disinfection unit 220 is coupled 214 to a UV controller 228. Similarly, the ion generator 230 is coupled 218 to an IG controller 236. The ion generator 230 is configured for attachment to a water input line 232 and to an output line 234, the input line 232 being attachable to the output line 226 of the UV disinfection unit 220 and the output line 234 being attachable to the inlet line 242 of an output signal device 240. The output signal device 240 also includes an outlet line 244 that is connected to a first "T" section 280 which, in turn, is connected to the discharge line 248 of the system 210 and to the inlet line 272 of the pump 270. A second "T" section 290 is connected to the outlet line 274 of the pump 270 and to the inlet line 222 of the UV disinfection unit 220. The second "T" section 290 is also connected to the system water inlet 246. The application of this alternative embodiment system 210 is also essentially the same at that described above for the first system 10 and the second system 110 with the exception that the pump 270 is introduced into the system 210 for the purpose of re-circulating water through the system 210 if such is desired or required. As was true with the first and second embodied systems 10, 110, any number of system parameters may be monitored and controlled by use of the output signal device 240 in combination with the PLC 250, the PLC 250 being coupled electronically 212, 216, 241 to the UV controller 228, the IG controller 236 and the output signal device 240, respectively. During this process, it is also to be understood that a pre-programmed scheme exists within the PLC 250 for operating the controllers 228, 236 and the UV disinfection unit 220 and the ion generator 230, respectively, as is desired or required.

From the foregoing description of the illustrative embodiments of the invention set forth herein, it will be apparent that there has been provided a new and useful method and system in which water flowing through a water system flows in proximity to an ion generation device and to a source of UV radiation that combines silver photochemistry principles, heavy metal toxicity, and UV light radiation to form a highly effective combined water disinfection process. Using ion generation and UV irradiation, the method and system of the present invention synergistically improves the disinfection and bactericidal effects of ion generation or UV radiation working individually by making ion-exposed microorganisms more susceptible and less resistant to the bactericidal effects of UV radiation. The combined method and system of the present invention may include control means such that the method and system can be configured for single pass through, dual pass through or for recirculation such that the order of exposure to the ion generation and UV radiation aspects can be varied or altered. The method and system of the present invention may also be provided with means for controlling ion generation and UV radiation levels to maximize performance, to minimize energy consumption, and, in some situations, to selectively target certain microorganisms for inactivation.

The principles of this invention having been fully explained in connection with the foregoing, we hereby claim as our invention:

1. A water treatment system comprising:
   an ion generator for applying metallic ions to the water having an inlet line and an output line;
   an output signal device for providing a signal based upon a flow rate of water passing through the output signal device, the output signal device having an input line and an output line, wherein the input line of the output signal device is connected to the output line of the ion generator;
   an ultraviolet disinfection unit for applying ultraviolet radiation to the water having an input line and an output line, wherein the input line of the ultraviolet disinfection unit is connected to the output line of the output signal device;
   an ion generator controller electronically coupled to the ion generator for controlling the ion generator;
   an ultraviolet disinfection unit controller electronically coupled to the ultraviolet disinfection unit; and
   a programmable logic controller electronically coupled to the output signal device and the ion generator controller and the ultraviolet light disinfection unit controller, whereby the programmable logic controller controls the ion generator controller and the ultraviolet disinfection controller in response to signal provided by the output signal device.

2. The water treatment system of claim 1 further comprising an additional ultraviolet disinfection unit having an inlet line and an output line, wherein the output line is connected to the input line of the ion generator.

3. A water treatment system comprising:
   an ultraviolet disinfection unit for applying ultraviolet radiation to the water having an input line and an output line;
   an ion generator for applying metallic ions to the water having an input line and an output line, wherein the input line of the ion generator is connected to the output line of the ultraviolet disinfection unit;
   an output signal device for providing a signal based upon a flow rate of water passing through the output signal device, the output signal device having an input line and an output line, wherein the input line of the output signal device is connected to the output line of the ion generator;

an ion generator controller electronically coupled to the ion generator for controlling the ion generator;

an ultraviolet disinfection unit controller electronically coupled to the ultraviolet disinfection unit; and a programmable logic controller electronically coupled to the output signal device and the ion generator controller and the ultraviolet light disinfection unit controller, whereby the programmable logic controller controls the ion generator controller and the ultraviolet disinfection controller in response to signal provided by the output signal device.

4. The water treatment system of claim 3, further comprising a pump having an inlet line and an outlet line, a first T-section for connecting the output line of the output signal device to a discharge line and the inlet line of the pump, and a second T-section for connecting an inlet line to the inlet line of the ultraviolet disinfection unit and the output line of the pump.

* * * * *